US008867567B2

(12) United States Patent
Sachs et al.

(10) Patent No.: US 8,867,567 B2
(45) Date of Patent: Oct. 21, 2014

(54) GENERIC ACCESS PERFORMANCE ABSTRACTION FOR ACCESS SELECTION

(75) Inventors: Joachim Sachs, Aachen (DE); Per Magnusson, Linköping (SE); Mikael Prytz, Rönninge (SE); Teemu Rinta-Aho, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1392 days.

(21) Appl. No.: 12/293,400

(22) PCT Filed: Mar. 24, 2006

(86) PCT No.: PCT/EP2006/002741
§ 371 (c)(1),
(2), (4) Date: Mar. 13, 2009

(87) PCT Pub. No.: WO2007/110090
PCT Pub. Date: Oct. 4, 2007

(65) Prior Publication Data
US 2009/0268750 A1    Oct. 29, 2009

(51) Int. Cl.
*H04L 29/06*  (2006.01)
*H04L 12/26*  (2006.01)
*H04L 29/08*  (2006.01)
*H04L 12/24*  (2006.01)

(52) U.S. Cl.
CPC ........... *H04L 43/08* (2013.01); *H04L 67/34* (2013.01); *H04L 12/2424* (2013.01); *H04L 41/0803* (2013.01); *H04L 41/0806* (2013.01); *H04L 41/5032* (2013.01)
USPC .......................................... 370/469; 370/431

(58) Field of Classification Search
CPC .. H04L 41/0803; H04L 67/34; H04L 12/2424

USPC .................................................. 370/431, 469
See application file for complete search history.

(56) References Cited

U.S. PATENT DOCUMENTS 6,690,679 B1 * 2/2004 Turunen et al. ............... 370/469
2002/0010771 A1 * 1/2002 Mandato ....................... 709/223

(Continued)

FOREIGN PATENT DOCUMENTS

EP    0949842 A2    10/1999
JP    2004-29157 A   10/2004

(Continued)

*Primary Examiner* — Mark Rinehart
*Assistant Examiner* — Matthew Hopkins

(57) ABSTRACT

The invention provides methods method for access selection in a Multi-Access Network offering a plurality of Access Technologies (AT). The device may comprises a Multi Access Management entity (MAM) and a plurality of Generic Link Layer Entities (GLL) associated to a plurality of Accesses (A) according to said plurality of Access Technologies (AT). The access selection comprises an Access determination and an Access configuration. In a first step a Generic Link Layer Entity (GLL) determines one or more Generic Performance Metrics (GPM) corresponding to one or more configurations of the Access (A). The Generic Link Layer Entity (GLL) sends the determined one or more Generic Performance Metrics (GPM) corresponding to one or more configurations of the access (A) to the Multi Access Management entity (MAM). The Multi Access Management entity (MAM) determines from received Generic Performance Metrics (GPM), which Access (A) offers a configuration (GPM), which is suited for an application/bearer requirements. Then, said Multi Access Management entity (MAM) sends the determined configuration to the Generic Link Layer Entity (GLL) associated to the determined Access (A). The determined Generic Link Layer Entity (GLL) configures the Access (A) based on the determined configuration received from the Multi Access Management entity (MAM). Furthermore, the invention relates to corresponding devices, modules and software.

14 Claims, 3 Drawing Sheets

(56) References Cited

U.S. PATENT DOCUMENTS

2004/0260750 A1* 12/2004 Ruutu et al. .................. 709/200
2007/0217349 A1* 9/2007 Fodor et al. ................ 370/310.2

FOREIGN PATENT DOCUMENTS

| WO | WO 00/72525 A | 11/2000 |
|----|---------------|---------|
| WO | WO 2005/062652 A | 7/2005 |

* cited by examiner

|  | ASPM (e.g. raw BER) | GPM (e.g. rate, delay, BER, PER) |
| --- | --- | --- |
| GPM 1 | rBER = $10^{-2}$ | Rate ~ 330 kb/s<br><br>Delay < 200 ms<br><br>BER < $10^{-4}$<br><br>PER < $10^{-6}$ |
| GPM 2 | rBER = $10^{-2}$ | Rate ~ 310 kb/s<br><br>Delay < 1000 ms<br><br>BER < $10^{-8}$<br><br>PER < $10^{-10}$ |
| GPM 3 | rBER = $10^{-2}$ | Rate ~ 300 kb/s<br><br>Delay < 100 s<br><br>BER = 0<br><br>PER = 0 |

Tab. 1

Fig. 4

GENERIC ACCESS PERFORMANCE ABSTRACTION FOR ACCESS SELECTION

TECHNICAL FIELD

In the telecommunications world, different networks are employed. To provide users with the services they want irrespective of their location, these networks need to cooperate. In a highly mobile environment, this network cooperation is established 'on the fly'.

BACKGROUND

In Multi-Access Networks, different access technologies (ATs) are used to provide an overlay of different accesses (As).

Typically, a data session, which is in the later called a bearer, has certain Quality of Service requirements (QoS), e.g. in terms of required data rate, delay, residual errors, etc.

Multi Access Management (MAM) is a function that observes the performance and capabilities of different accesses (As) that can be used for a bearer, and selects the one—or more in case of parallel usage of multiple links—access (A) which is (best) suited to the bearer requirements.

For this purpose, Multi Access Management (MAM) requires information about the performance and capabilities of the different accesses (As) which are available for the bearer.

Such information by way of example may comprise a rate requirement and/or a delay requirement and/or a (residual) bit error rate and/or a (residual) packet error rate.

One problem is that different accesses (As) use different access technology specific metrics to specify their performance respectively capabilities. A metric is understood as being any kind of information related to a quantification of characteristics.

These technology specific metrics may comprise by way of example, a raw bit error rate and/or a Received Signal Strength Indicators (RSSI) and/or a Signal to Interference-plus-Noise Ratio (SINR).

Therefore, it is difficult to compare the different accesses (As).

For example, it is not trivial to compare a received signal strength indicator (RSSI) of −15 dBm for a WLAN radio access (A) with a 3G radio access (A) with a signal-to-noise-and-interference ratio of 3 dB.

In order to make such a comparison possible, the Generic Link Layer (GLL) provides a functionality to translate access technology specific access characteristics into a generic performance/capability of the access, i.e. an abstraction. As is well known in the art the GLL provides generic data processing for a multitude of radio access technologies.

Based on the generic access capability/performance descriptions provided by the Generic Link Layer entities, a Multi Access Management (MAM) should provide an appropriate access selection decision.

Hence, the Generic Link Layer abstracted access capabilities should be matchable with the QoS requirements of the bearer.

Therefore, the abstractions should be similar to the QoS metrics, like data rate, delay, residual bit error rate (BER) or packet error rate (PER).

One problem is, how this access performance abstraction shall be carried out.

Another problem is, that for one set of access specific performance metrics (ASPM), i.e. the access performance, a plurality of different generic performance metrics (GPM) may be generated, depending on how the link layer is configured. Generic Performance Metrics may include rate, delay, Bit Error Rate (BER) and packet error rate (PER).

Hence, there is typically a set of generic performance metrics (GPM) owing to different possible configurations.

Therefore, it is a problem to decide, which one of the generic performance metrics (GPM) should be used representing a specific configuration of an Access and/or which specific Access should be used.

Known techniques, such as in UMTS-systems, do not experience such problems, since the resources of the system are adapted after they are selected to fulfill the requirements to their best.

However, these techniques are neither flexible nor allow for optimization of fixed amounts of resources.

SUMMARY

It is the object to obviate at least some of the above disadvantages and provide a Method for access selection of a system in a Multi-Access Network offering a plurality of Access Technologies, and the system and software therefore.

The proposed method for access selection is performed in a device in a Multi-Access Network.

The device offers a plurality of Access Technologies, whereby the device comprises a Multi Access Management entity and a plurality of Generic Link Layer Entities corresponding to a plurality of Accesses according to said plurality of Access Technologies.

Access selection comprises an Access determination and an Access configuration.

In a first step, a Generic Link Layer Entity determines one or more Generic Performance Metrics corresponding to one or more configurations of the Access. An Access is associated to a Generic Link Layer Entity. However, a Generic Link Layer Entity may serve a plurality of Accesses.

Then, said Generic Link Layer Entity sends the determined one or more Generic Performance Metrics corresponding to one or more configurations of the access to the Multi Access Management entity.

In turn, the Multi Access Management entity determines from received determined Generic Performance Metrics, which Access offers a configuration, which is suited for an application/bearer requirements.

Afterwards, the Multi Access Management entity reports the determined configuration to the determined Generic Link Layer Entity.

Thereafter, the determined Generic Link Layer Entity configures the Access based on the determined configuration reported by the Multi Access Management entity.

In a further embodiment, the determined Generic Link Layer Entity reports generic performance metrics for said determined configuration.

Additionally, the Multi Access Management entity may forward bearer requirements to one or more Generic Link Layer Entity before a Generic Link Layer Entity determines one or more Generic Performance Metrics corresponding to one or more configurations of the Access. In this case a Generic Link Layer Entity having received bearer requirements determines one or more Generic Performance Metrics on the basis of the received bearer requirements, whereby Generic Performance Metrics, which do not meet the forwarded bearer requirements, will later-on not be reported.

Furthermore, the Generic Link Layer Entity may also determine one or more Generic Performance Metrics corresponding to one or more configurations of the Access by analytical derivation or by way of one or more mapping tables.

In a further embodiment, the invention is embodied in a Method for a Generic Link Layer Entity for providing Generic Performance Metrics for access selection in a Multi-Access Network offering a plurality of Access Technologies.

In a first step one or more Generic Performance Metrics corresponding to one or more configurations of the Access are determined.

Next, the determined one or more Generic Performance Metrics corresponding to one or more configurations of the access are send to a Multi Access Management entity.

Afterwards, a determined configuration will be received from said Multi Access Management entity.

Thereafter, the Access will be configured based on the determined configuration reported by the Multi Access Management entity.

In a further embodiment generic performance metrics may be send for said determined configuration.

Additionally, the Generic Link Layer Entity may receive from the Multi Access Management entity bearer requirements. In this case the determination of the one or more Generic Performance Metrics is based on the received bearer requirements, whereby Generic Performance Metrics, which do not meet the forwarded bearer requirements, will later-on not be reported.

Furthermore, the one or more Generic Performance Metrics corresponding to one or more configurations of the Access may also be determined based on an analytical derivation or on one or more mapping tables.

Still in a further embodiment of the invention, the invention is embodied in a Method for a Multi Access Management entity for access selection of a device in a Multi-Access Network offering a plurality of Access Technologies.

In a first step one or more determined Generic Performance Metrics corresponding to one or more configurations of the access are received from one or more Generic Link Layer Entities.

Subsequently it is determined from said received Generic Performance Metrics, which Access offers a configuration, which is suited for an application/bearer requirements, Thereafter, the determined configuration is send to the determined Generic Link Layer Entity for provoking the determined Generic Link Layer Entity to configure the Access based on the determined configuration reported by the Multi Access Management entity.

Additionally, the Multi Access Management entity may send bearer requirements to one or more Generic Link Layer Entity.

Still further, the invention is also embodied in corresponding devices and modules.

A Device according to the invention may comprise a plurality of Accesses according to a plurality of Access Technologies.

The device comprises means for determining one or more Generic Performance Metrics corresponding to one or more configurations of the Access, whereby the determined one or more Generic Performance Metrics correspond to one or more configurations of the access.

Furthermore, the device comprises means for access selection adapted to determine from Generic Performance Metrics, which Access offers a configuration, which is suited for an application/bearer requirements, whereby said means for determining one or more Generic Performance Metrics are adapted to configure an Access based on the determined configuration.

A Module for providing Generic Performance Metrics for access selection in a Multi-Access Network offering a plurality of Access Technologies, according to the invention comprises means for determining one or more Generic Performance Metrics corresponding to one or more configurations of the Access.

Furthermore, the module comprises means for sending the determined one or more Generic Performance Metrics corresponding to one or more configurations of the access towards a Multi Access Management entity, and means for receiving from said Multi Access Management entity a determined configuration, whereby the means for determining one or more Generic Performance Metrics are further adapted to configure the Access based on the determined configuration received by the Multi Access Management entity.

A Module for access selection in a Multi-Access Network offering a plurality of Access Technologies, according to the invention comprises means for receiving one or more determined Generic Performance Metrics corresponding to one or more configurations of the access from one or more Generic Link Layer Entities.

Furthermore, said module comprises means for determining from said received Generic Performance Metrics, which Access offers a configuration, which is suited for an application/bearer requirements, and means for sending the determined configuration to the determined Generic Link Layer Entity for provoking the determined Generic Link Layer Entity to configure the Access based on the determined configuration reported by the Multi Access Management entity.

Still further, the invention may also be embodied in Software allowing for performing a method as described above, when being executed.

BRIEF DESCRIPTION OF THE DRAWINGS

By means of the appended figures the invention will now be described in detail:

In the following

FIG. 4 shows a table presenting several Generic Performance Metrics provided by a Generic Link Layer Entity in accordance with the invention.

DETAILED DESCRIPTION

Figure 1:
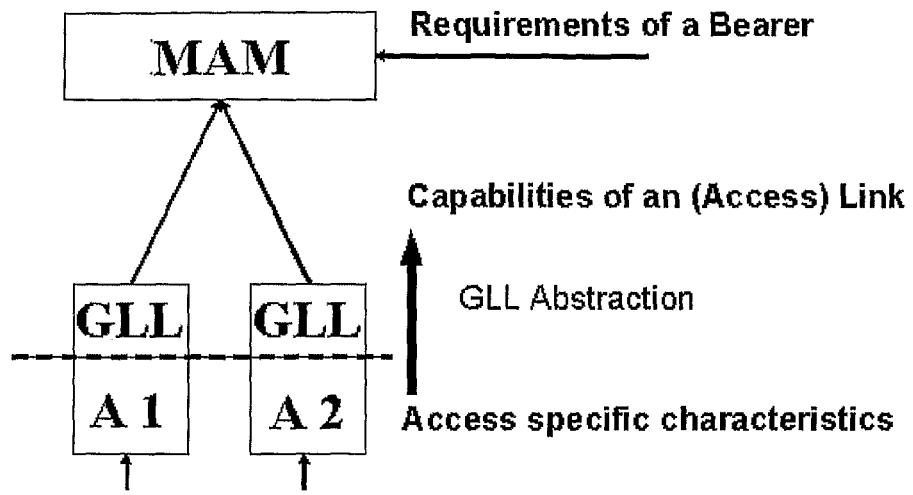
FIG. 1 to 3 show exemplary functional set-ups of a device incorporating the invention.
Figure 2:
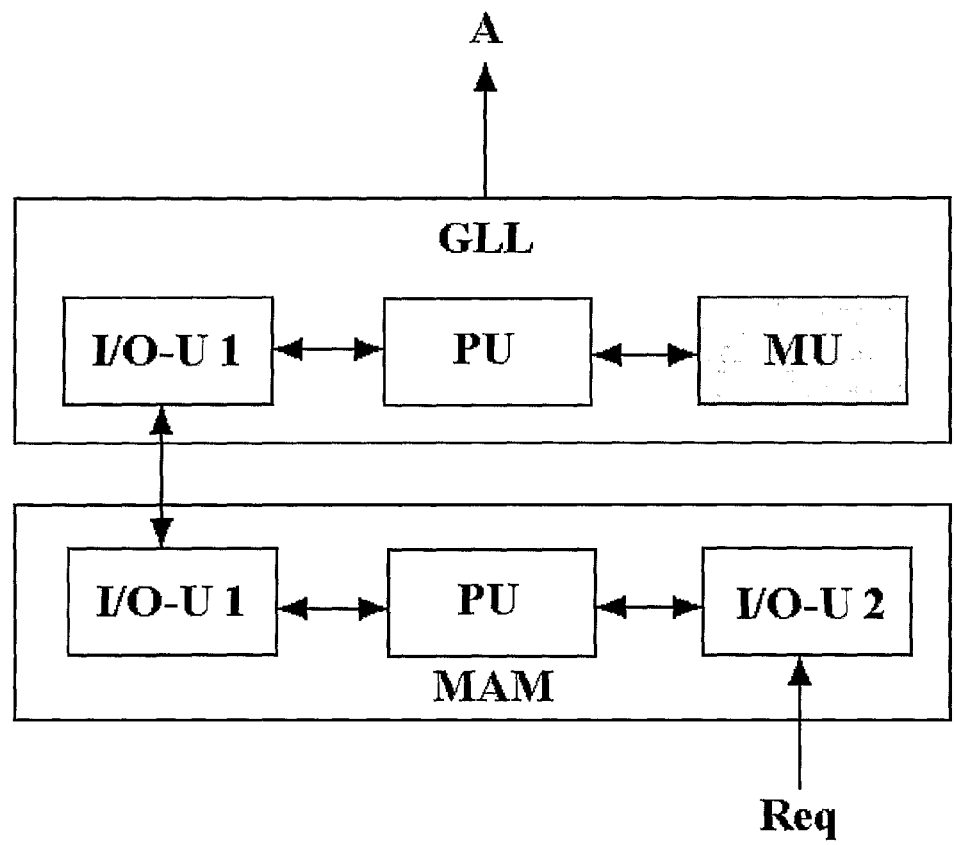
Figure 3:
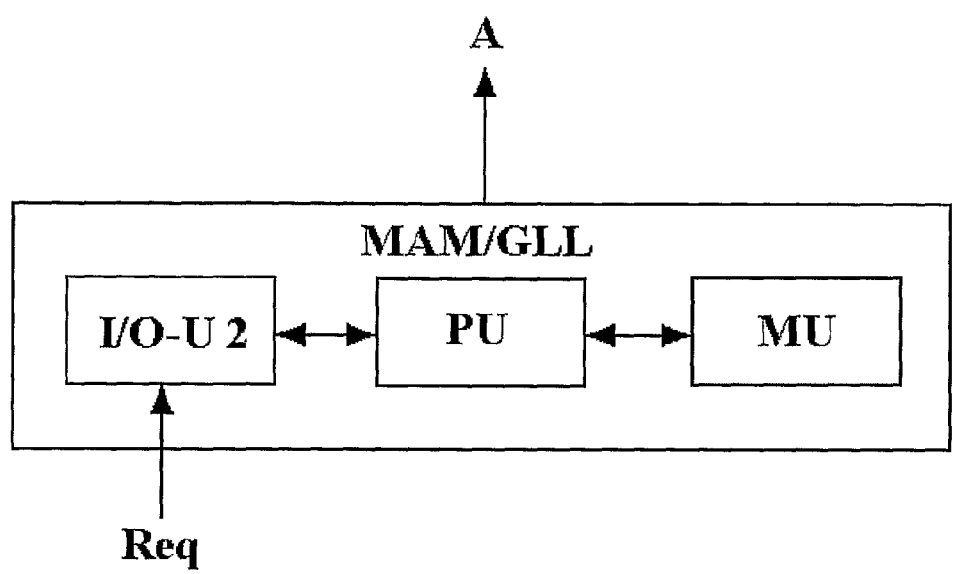

FIG. 1 to 3 show exemplary functional set-ups of devices incorporating the invention.

In specific, FIG. 1 shows two Accesses (A1, A2) and respective

Generic Link Layer Entities (GLL A1, GLL A2) coupled to a Multi Access Management Entity (MAM).

FIG. 2 in turn shows a possible internal set-up of a Multi Access Management Entity (MAM) and a Generic Link Layer Entity (GLL).

A device according to the invention can be any kind of a computer, a mobile station, a PDA or devices offering any of such functionality.

Such a device may include a functionality to which will be referred to as a Multi Access Management Entity.

The Multi Access Management Entity (MAM) may be coupled via an Interface (I/O-U 1) to one or more Generic Link Layer Entities having a corresponding interface (I/O-U 1), whereby the Generic Link Layer Entities correspond to a plurality of Accesses (A1, A2).

In other embodiments such as depicted in FIG. 3, the Multi Access Management Entity (MAM) and one or more Generic Link Layer Entities may form a single device.

Furthermore, the Multi Access Management Entity (MAM) receives via another Interface (I/O-U 2) Requirements of a Bearer (Req) as outlined above.

The Accesses (A1, A2) may relate to the same or different Access Technologies (AT) such as wireless Access Technologies like UMTS, GSM, GPRS, WiMax, W-Lan, Bluetooth, etc or wire-based Access Technologies like Ethernet, DSL, Cable TV, Powerline, optical Fiber, USB, Firewire, etc.

Hence, an access may be any kind of a suited transmitter and receiver.

As will be apparent to those skilled in the art, the Accesses, the Generic Link Layer Entities and the Multi Access Management Entity may be modularized.

For example, the Multi Access Management Entity may be embodied in a software-enabled or a dedicated processing unit (PU) or in an add-on module such as a plug-in card such as for example a PCI card or a PCMCIA card for a computer.

Accesses (A1, A2) may be modularized as well in an add-on module such as a PCI card or a PCMCIA card for a computer.

For example, a computer such as a notebook or a PDA or a mobile station may be equipped with some access technologies such as Bluetooth and UMTS.

A corresponding docking station may be equipped with an Ethernet-module, a DSL-module or other modules corresponding to other access technologies.

When connecting the notebook, PDA or mobile station to the docking station, these access technologies would become also available.

An access module may comprise a Generic Link Layer Entity (GLL A1, GLL A2). The Generic Link Layer Entity may be embodied in a software-enabled or a dedicated processing unit (PU).

A Generic Link Layer Entity (GLL) determines one or more Generic Performance Metrics (GPM) corresponding to one or more configurations of one or more Accesses (A).

Such a determination may be performed upon request or on a regular basis or on assembly of modules or on becoming available of certain access technologies as explained above with respect to docking to a docking station.

Typically, an access provides several options for configuration. These configurations lead to different Generic Performance Metrics, i.e. the abstraction is configuration sensitive.

For example, an access specific performance metric (ASPM) of an access is a raw Bit Error Rate (rBER), i.e. the bit error rate before decoding, is $10^{-2}$. Other access specific performance metrics (ASPM) which could be used encompass Received Signal Strength Indicators (RSSI), Signal to Interference-plus-Noise Ratio (SINR), etc.

As exemplary depicted in Tab. 1, the access may be configured in several ways.

For example, the access may be configured in a way that it provide a rate of about 330 kb/s at a delay less than 200 ms while providing a Bit Error Rate of less than $10^{-4}$ and a Packet Bit Error Rate of less than $10^{-6}$ as described in row 1 or alternatively as described in the following row each representing a different configuration of the access (A).

Hence, several Generic Performance Metrics (GPM 1, GPM 2, GPM 3) may be determined for an access specific performance metric (ASPM).

Each of these Generic Performance Metrics (GPM 1, GPM 2, GPM 3) may be useful for certain applications, for example the first Generic Performance Metric (GPM 1) represents a link configuration with only a few retransmissions due to the access, the second Generic Performance Metric (GPM 2) represents a link configuration with many retransmissions due to the access, whereas the third Generic Performance Metric (GPM 3) represents a fully reliable link configuration.

Once the one or more Performance Metrics (GPM 1, GPM 2, GPM 3) are determined, the Generic Link Layer Entity (GLL) reports the determined Generic Performance Metrics (GPM 1, GPM 2, GPM 3) corresponding to one or more configurations of the access (A) to the Multi Access Management entity (MAM) via the interface (I/O-U 1).

The Multi Access Management entity (MAM) determines from received Generic Performance Metrics (GPM 1, GPM 2, GPM 3), which Access (A1, A2) offers a configuration (GPM 1, GPM 2, GPM 3), which is (best) suited for an application/bearer requirements.

If several Accesses (A1, A2) are connected to the Multi Access Management entity (MAM), the determination can either be a two-step analysis first determining an access and than determining its configuration (best) suited or the determination can be a one-step analysis determining from all Generic Performance Metrics received by all Generic Link Layer Entity the one which is (best) suited.

Once, a suited configuration is determined the Multi Access Management entity (MAM) reports the determined configuration to the determined Generic Link Layer Entity (GLL) via the interface (I/O-U 1).

The determined Generic Link Layer Entity (GLL) in turn configures the Access (A) based on the determined configuration reported by the Multi Access Management entity (MAM).

Subsequently and optionally, the determined Generic Link Layer Entity (GLL) may report generic performance metrics (GPM) for the determined configuration only.

Additionally, the Multi Access Management entity (MAM) may forward bearer requirements previously received via another interface (I/O-U 2) to one or more Generic Link Layer Entity (GLL) before, a Generic Link Layer Entity (GLL) determines one or more Generic Performance Metrics (GPM) corresponding to one or more configurations of the Access (A).

A Generic Link Layer Entity (GLL) having received bearer requirements via the interface (I/O-U 1) determines one or more Generic Performance Metrics (GPM) on the basis of the received bearer requirements whereby Generic Performance Metrics (GPM), which do not meet the forwarded bearer requirements, will later-on not be reported.

In doing so, the amount of communication between a Generic Link Layer Entity and a Multi Access Management entity is reduced and some intelligence of the Multi Access Management (MAM) is distributed to the Generic Link Layer Entities (GLL).

Several procedures may be implemented to determine one or more Generic Performance Metrics (GPM) corresponding to one or more configurations of the Access (A).

For example, the determination could be an analytical derivation and/or a mapping according to one or more mapping tables.

For example, a mapping table may be based on certain access specific performance metrics (ASPM) and a number N of allowed retransmissions.

For example, the following parameters which may be contained in a Generic Performance Metric (GPM) may be derived as follows:

$$Delay = N * x$$

where x is a fix, access specific number and N is the number of retransmissions

BER=f (ASPM, N,)
PER=f (ASPM, N)
Rate=f (ASPM, N)

However, other functions may also be applicable.

As stated above, other access specific performance metrics (ASPM) which could be used encompass Received Signal Strength Indicators (RSSI), Signal to Interference-plus-Noise Ratio (SINR), Channel Quality Indicator (CQI), etc.

For this purpose the Generic Link Layer Entities or the access may also be equipped with a measuring unit (MU) allowing to measure corresponding parameters.

As already explained, the Multi Access Management entity (MAM) and the Generic Link Layer Entities (GLL) allowing to perform the methods as outlined above may be modularized. However, they also could be integrated into a single device and/or into a more complex device, such as a computer, PDA, Laptop, etc.

An integrated solution such as shown in FIG. 3 may provide additional advantages in that certain components shown in FIG. 2 could be omitted such as an Interface (I/O-U 1) or used in a combined manner, such as the processing unit (PU). In doing so a higher degree of integration could be reached.

As described also software enabled processing units may represent such modules or devices.

By means of the above described invention it is possible to provide a extremely flexible system, devices, modules and methods therefore allowing to flexibly select and configure an access according to bearer requirements.

The invention claimed is:

1. A method for Access (A) selection in a Multi-Access Network offering a plurality of Access Technologies (T), the Multi-Access Network comprising a Multi-access Management Entity (MAM) and a plurality of Generic Link Layer Entities (GLL) associated with a plurality of Accesses (A) according to said plurality of Access Technologies (AT), the access selection comprising an Access determination and an Access configuration, the method comprising the steps of:
One or more GLL determining a plurality of Generic Performance Metrics (GPM) corresponding to a plurality of configurations of the plurality of Accesses (A);
the one or more of GLL sending the determined plurality of GPM to the MAM, said MAM determining from the determined plurality of GPM which one of the plurality of Accesses provides a configuration appropriate for application and bearer requirements;
said MAM sending the determined configuration to the one or more GLL associated to the one of the plurality of Accesses; and
said one or more GLL configuring the one of the plurality of Accesses (A) based on the determined configuration received from the MAM.

2. The method according to claim 1, further comprising the step of said one or more GLL associated with the determined Access (A) sends the plurality of Generic Performance Metrics (GPM) for the determined configuration.

3. The method according to claim 1, further comprising the steps of:
the Multi Access Management entity sending bearer requirements to the one or more GLL before the one or more GLL determines the plurality of Generic Performance Metrics (GPM) corresponding to the configurations of the Access (A), and
the one or more GLL having received bearer requirements determining the Generic Performance Metrics (GPM) on the basis of the received bearer requirements, whereby the Generic Performance Metrics (GPM), which do not meet the received bearer requirements, will not be reported.

4. The method according to claim 1, further comprising said one or more GLL determining the Generic Performance Metrics (GPM) corresponding to the configurations of the Access (A) by analytical derivation.

5. The method according to claim 1, further comprising the step of said one or more GLL determining the Generic Performance Metrics (GPM) corresponding to configuration of the Access (A) by way of mapping tables.

6. A method for a Generic Link Layer Entity (GLL) for providing Generic Performance Metrics (GPM) for access selection in a Multi-Access Network providing a plurality of Access Technologies (AT), the method comprising the steps of:
determining Generic Performance Metrics (GPM) corresponding to a configuration of an Access (A),
sending the determined Generic Performance Metrics (GPM) corresponding to the configuration of the Access (A) to a Multi Access Management entity (MAM),
receiving from said Multi Access Management entity (MAM) a determined configuration, and
configuring the Access (A) based on the determined configuration received from the Multi Access Management entity (MAM).

7. The method according to claim 6, further comprising the step of sending the generic performance metrics (GPM) for the determined configuration.

8. The method according to claim 6, further comprising the step of:
receiving from the Multi Access Management entity (MAM) bearer requirements, whereby the determination of the Generic Performance Metrics (GPM) is based on the received bearer requirements, and whereby Generic Performance Metrics (GPM), which do not meet the received bearer requirements, will not be reported.

9. The method according to claim 6, wherein said determination of the Generic Performance Metrics (GPM) corresponding to the configuration of the Access (A) is based on an analytical derivation.

10. The method according to claim 6, wherein said determination of the Generic Performance Metrics (GPM) corresponding to the configuration of the Access (A) is based on mapping tables.

11. A method for a Multi Access Management entity (MAM) for Access (A) selection in a Multi-Access Network providing a plurality of Access Technologies (AT), the method comprising the steps of:
receiving determined Generic Performance Metrics (GPM) corresponding to a configuration of an Access (A) from a Generic Link Layer Entity (GLL), whereby an Access (A) is associated to the Generic Link Layer Entity (GLL),
determining from said received Generic Performance Metrics (GPM), which Access (A) provides a configuration appropriate for application and bearer requirements,
sending the determined configuration to the Generic Link Layer Entity (GLL) associated to the determined Access (A) for causing the determined Generic Link Layer Entity (GLL) to configure the Access (A) based on the determined configuration received from the Multi Access Management entity (MAM), and
sending bearer requirements to one or more Generic Link Layer Entities (GLL).

12. A device for Access (A) selection in a Multi-Access Network providing a plurality of Access Technologies (AT), the device comprising:
  a plurality of Accesses (A) according to said plurality of Access Technologies (AT); and
  an associated, non-transitory machine-readable medium comprising instructions which, when executed by a processor cause the device to:
    determine Generic Performance Metrics (GPM) corresponding to a configuration of a plurality of Accesses (A), and
    determine from the Generic Performance Metrics (GPM), which Access (A) provides a configuration, appropriate for application and bearer requirements, whereby said Generic Performance Metrics (GPM) are programmed to configure the Access (A) based on the determined configuration.

13. A module for providing Generic Performance Metrics (GPM) for Access (A) selection in a Multi-Access Network providing a plurality of Access Technologies (AT), the module comprising:
  an associated, non-transitory machine-readable medium comprising instructions which, when executed by a processor cause the module to:
    determine Generic Performance Metrics (GPM) corresponding to a configuration of the Access (A);
    send the determined Generic Performance Metrics (GPM) corresponding to the configuration of the access (A) to a Multi Access Management entity (MAM), and
    receive from said Multi Access Management entity (MAM) a determined configuration, whereby the Generic Performance Metrics (GPM) are arranged to configure the determined Access (A) based on the determined configuration received by the Multi Access Management entity (MAM).

14. A module for Access (A) selection in a Multi-Access Network providing a plurality of Access Technologies (AT) associated with a plurality of Generic Link Layer Entities (GLL), the module comprising:
  an associated, non-transitory machine-readable medium comprising instructions which, when executed by a processor cause the processor to:
    receive a plurality of determined Generic Performance Metrics (GPM) corresponding to a plurality of configurations of each of a plurality of Accesses (A) from one or more of the plurality of Generic Link Layer Entities (GLL);
    determine from said received plurality of Generic Performance Metrics (GPM), which Access (A) provides a configuration appropriate for application and bearer requirements, and
    send the determined configuration to the one or more Generic Link Layer Entity (GLL) associated with the determined Access (A) for invoking the one or more Generic Link Layer Entity (GLL) to configure the Access (A) based on the determined configuration reported by the Multi Access Management entity (MAM).

* * * * *

UNITED STATES PATENT AND TRADEMARK OFFICE
CERTIFICATE OF CORRECTION

| | | |
|---|---|---|
| PATENT NO. | : 8,867,567 B2 | Page 1 of 1 |
| APPLICATION NO. | : 12/293400 | |
| DATED | : October 21, 2014 | |
| INVENTOR(S) | : Sachs et al. | |

It is certified that error appears in the above-identified patent and that said Letters Patent is hereby corrected as shown below:

On the Title Page, in Item (57), under "ABSTRACT", in Column 2, Line 1, delete "methods method" and insert -- methods/method --, therefor.

In the Specification

In Column 3, Line 42, delete "requirements," and insert -- requirements. --, therefor.

In Column 4, Line 41, delete "FIG. 1 to 3" and insert -- FIGS. 1 to 3 --, therefor.

In Column 4, Line 49, delete "FIG. 1 to 3" and insert -- FIGS. 1 to 3 --, therefor.

In Column 4, Lines 53-54, delete "Generic.......(MAM)." and insert the same at Line 52, after "respective" as a continuation paragraph.

In Column 6, Line 20, delete "than" and insert -- then --, therefor.

In the Claims

In Column 7, Line 40, in Claim 1, delete "One" and insert -- one --, therefor.

Signed and Sealed this
Seventeenth Day of November, 2015

Michelle K. Lee
*Director of the United States Patent and Trademark Office*